(12) United States Patent
Wixforth et al.

(10) Patent No.: US 6,825,803 B2
(45) Date of Patent: Nov. 30, 2004

(54) COMBINED RECEIVER AND TRANSPONDER MODULE

(75) Inventors: Thomas Wixforth, Langerburg (DE); Wolfgang Detlefsen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,682

(22) PCT Filed: Jun. 20, 2001

(86) PCT No.: PCT/DE01/02283

§ 371 (c)(1), (2), (4) Date: Sep. 10, 2003

(87) PCT Pub. No.: WO02/11240

PCT Pub. Date: Feb. 7, 2002

(65) Prior Publication Data

US 2004/0051661 A1 Mar. 18, 2004

(30) Foreign Application Priority Data

Aug. 1, 2000 (DE) .......................... 100 37 386

(51) Int. Cl.$^7$ ................................ G01S 5/14
(52) U.S. Cl. ................... 342/357.1; 343/725
(58) Field of Search ................ 342/357.1; 343/725, 343/700 MS

(56) References Cited

U.S. PATENT DOCUMENTS

| | | | |
|---|---|---|---|
| 4,089,003 A | | 5/1978 | Conroy ................ 343/700 MS |
| 4,783,661 A | | 11/1988 | Smith .................. 343/700 MS |
| 5,124,714 A | * | 6/1992 | Harada ........................ 343/713 |
| 5,270,722 A | | 12/1993 | Delestre .............. 343/700 MS |
| 5,610,620 A | * | 3/1997 | Stites et al. .................. 343/725 |
| 5,650,792 A | * | 7/1997 | Moore et al. ............... 343/725 |
| 5,654,717 A | * | 8/1997 | Nichols et al. ........ 342/357.06 |
| 5,706,015 A | * | 1/1998 | Chen et al. .......... 343/700 MS |
| 6,091,365 A | | 7/2000 | Derneryd et al. .... 343/700 MS |
| 6,097,974 A | * | 8/2000 | Camp et al. ............. 455/575.7 |
| 6,249,253 B1 | * | 6/2001 | Nielsen et al. .............. 342/463 |
| 6,298,243 B1 | * | 10/2001 | Basile ..................... 455/552.1 |

* cited by examiner

Primary Examiner—Gregory C. Issing
(74) Attorney, Agent, or Firm—Kenyon & Kenyon

(57) ABSTRACT

A vehicle navigational receiver module includes a first planar antenna for receiving navigational radio signals, a signal processing circuit that is connected to the antenna, as well as a ground plane. In addition, a second planar antenna for receiving a telematic radio signal is arranged so as to at least partially overlap the first planar antenna and is connected to a second signal processing circuit.

12 Claims, 3 Drawing Sheets

COMBINED RECEIVER AND TRANSPONDER MODULE

FIELD OF THE INVENTION

The present invention relates to a vehicle navigational receiver module.

BACKGROUND INFORMATION

Conventional receiver modules may be used, for example, for receiving GPS navigational radio signals.

The number of radio services that are used in motor vehicles is steadily increasing, and the spectrum of radio frequencies that are used by these services is becoming wider and wider. The different frequencies of the services require antennas of different types of construction and dimensions, and mounting them on a vehicle is becoming increasingly problematic.

The navigational radio service GPS (Global Positioning System) works at a frequency of 1.57542 GHz; for receiving the signals of this service, active patch antennas are generally used, more precisely, microstrip antennas including remote-fed, low-noise amplifiers. A receiver module of this type may be mounted in the area of the vehicle skin so as to save space; the actual GPS receiver, in which the radio signals are evaluated and position information is determined, may be connected to this module by a long cable and may therefore be mounted anywhere in the vehicle.

Familiar as a telematic service for use in vehicles is the DSRC system (Dedicated Short Range Communications for Road Transport Telematics). It operates on a frequency of 5.8 GHz. It is used, for example, for the automated determination, or the electronic payment, of tolls.

DSRC transponders, so-called OBUs (On Board Units), are currently found mainly as small retrofitted units, that are mounted in the interior of a motor vehicle on the windshield. So as not to impair the visibility through the windshield, these transponders are generally mounted in the upper edge area of the windshield in the area covered by the interior rear view mirror. This area is quite small and not well suited to accommodating antennas for a plurality of radio services having various frequencies. However, the possibilities of mounting antennas at other locations in the motor vehicle are also limited because placing them under the metallic skin of the vehicle is impossible in principle.

SUMMARY

It is an object of the present invention to use a vehicle navigational radio service and a telematic radio service, while making economical use of the space available for mounting antennas on the vehicle surface.

This object may be achieved in accordance with the present invention by mounting a second planar antenna for receiving a telematic radio signal so that it at least partially overlaps the first antenna, and connecting it to a second signal processing circuit. The antennas and the associated signal processing circuits are thus joined to form a combined module, whose space requirements on the vehicle surface are not greater, or at most only slightly greater, than those of the larger of the individual antennas.

The two planar antennas, specifically, microstrip antennas, may include patches, that are separated from each other by a first dielectric and are separated from a common ground plane (area) by a second dielectric, the dielectric constants of the dielectrics being different and the patch for the higher-frequency radio signal bordering on the dielectric having the lower constant, and the patch for the lower-frequency radio signal bordering on the dielectric having the higher constant.

In conventional microstrip antennas, the resonance frequency is determined, on the one hand, by the dimensions of the microstrip antenna itself and, on the other hand, by the dielectric constants of a material that separates the microstrip antennas from a ground plane arranged opposite. The higher this dielectric constant is, the smaller the microstrip antenna may be, assuming the identical resonance frequency. The assignment of dielectrics to the antennas makes it possible to reduce the dimensions of the antenna assigned to the lower-frequency signal and to make them approximate those of the other antenna, thus ultimately making for a compact configuration of the antenna set-up.

For purposes of manufacturing, the patches of the two antennas may be arranged in parallel planes.

Due to the diversity in the operating frequencies of the radio services in question and of the two antennas, it is possible to connect the processing circuits to the patches using one common supply line.

However, in order to avoid overcoupling between the signals of the different radio services, each patch may be connected to the assigned processing circuit by its own supply line.

This may be achieved by routing the supply line of the exterior of the two patches through an opening in the other one, arranged between the exterior patch and the ground plane.

According to one exemplary embodiment, the two planar antennas each have different main transmitting directions. A differentiation of this type in the main transmitting directions reflects the individual application situation of the two radio signals. Whereas GPS radio signals arrive on average from the zenithal direction, telematic signals are generally received at changing angles of elevation in an angular range that is centered around the direction of motion of the vehicle. Therefore, it is useful if the antenna for the navigational signal is aligned to the vertical, while the antenna for the telematic signal is aligned to the direction of motion of the vehicle.

A differentiation of this type may be achieved in that the centroids of the patches of the two antennas, as projected onto the ground plane, are offset with regard to each other.

To achieve the desired orientation of the main transmitting direction, it is useful if the installation position is oriented such that the link between the projected centroids extend in the direction of the strongest gradient of the ground plane, in other words, the orientations of the patches are selected so that their surface normals lie between the expected average directions of incidence of the navigational radio signal and of the telematic radio signal.

In addition, it is useful if the patch of the second planar antenna, assigned to the telematic radio signal, is arranged in a plane between the patch of the first planar antenna and the ground plane. In this manner, the reception of the navigational signals, originating from very distant satellites and having limited transmission power, is not impaired by the antenna for the telematic radio signal; damping the reception of this signal by the first planar antenna may be tolerated much better, because, in the case of most telematic applications, the vehicle passes at a short distance to a transmitter of the telematic radio signal. Thus, the telematic radio signal in any case is received at a high level of dynamic response, and any deficit in the reception level that may arise may be equalized much more easily, by slightly increasing the transmission power, than in the case of navigational radio signals.

To connect the module to a motor vehicle electronics, a common connector may be used, through which navigational and telematic signals are transmitted in different frequency ranges. This facilitates the integrated processing of telematic navigational signals, e.g., calculating tolls on the basis of data from the navigational system.

Control signals for switching the processing circuit of the telematic radio signal between the transmitting and receiving modes may be sent in a further frequency range via this connector.

Finally, a DC component of a signal that is fed from outside to the connector is well suited for supplying power to the signal processing circuit of the module.

All of these signals may be conveniently conveyed over one single coaxial cable, for which reason the connector may be configured as a coaxial connector.

DETAILED DESCRIPTION

Figure 1:
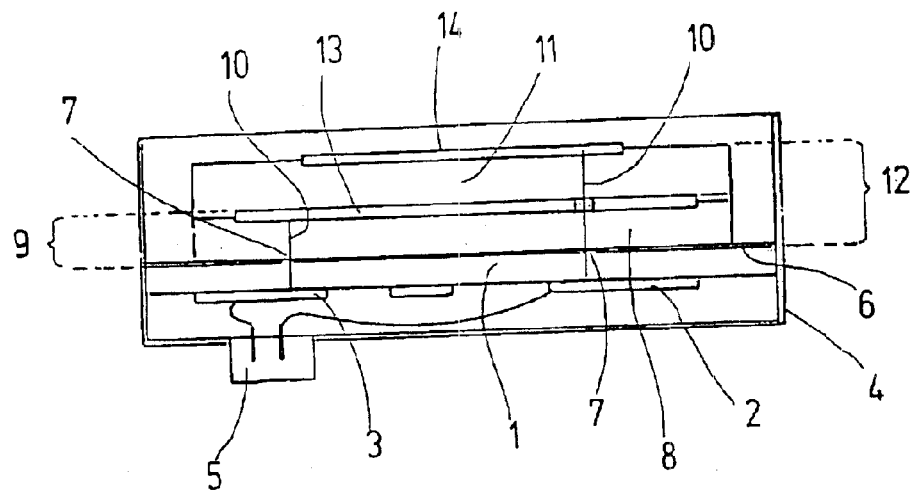
FIG. 1 illustrates a schematic cutaway view of a combined GPS receiver/DSRC transponder module according to an example embodiment of the present invention.

The receiver/transponder module illustrated in FIG. 1 includes a printed circuit board 1, which, on the side facing down in this figure, includes signal processing circuits 2, 3, for GPS and DSRC radio signals, respectively. These signal processing circuits 2, 3 are each solely responsible for a preamplification of the received signals, and, in the case of the DSRC signal, they bring about a conversion to baseband. Therefore, signal processing circuits 2, 3 function solely to process the received signals to the point that they may be transmitted over a common cable to a final processing circuit, without influencing each other and without disruptive damping, the final processing circuit is not shown in the Figures. Plug-in connectors 5 are provided on a housing 4 of the module for retrieving the signals that have been preprocessed in this manner.

On the side of printed circuit board 1 that is facing away from signal processing circuits 2, 3, a metal ground plane 6 is provided, which covers printed circuit board 1 on practically its entire extension, with the exception of two openings 7.

On ground plane 6, a first plate 8 made of a dielectric material is secured, which, on its surface facing away from ground plane 6, supports a first patch 13, which along with ground plane 6 and dielectric 8 constitutes a first planar antenna, more precisely, a microstrip antenna 9. First patch 13, via a supply line 10 which extends through one of openings 7 of ground plane 6, delivers a received signal to signal processing circuit 3, or, in the event signal processing circuit 3 is a part of a transponder for telematic radio signals, patch 13 either delivers a received signal or is supplied with the appropriate response signals by signal processing circuit 3.

First microstrip antenna 9 is covered by a second plate 11 made of dielectric material, on whose exterior surface a second patch 14 is arranged. The latter is connected via a supply line, which extends through the second opening 7 of ground plane 6 and through a corresponding opening in first patch 13, to pre-processing circuit 2. The second patch, along with ground plane 6 and dielectrics 8, 11, constitutes a second planar antenna, i.e., microstrip antenna 12.

In the case illustrated here, second microstrip antenna 12 is provided for receiving a GPS signal having a frequency of 1.57542 GHz, whereas antenna 9, whose patch 13 is arranged closer to the ground plane, is provided for receiving and transmitting a DSRC radio signal of approximately 5.8 GHz. Due to the fact that the dielectric constant of second dielectric plate 11 is selected so as to be significantly higher than that of first plate 8, it is possible for both antennas to be resonant at the respective frequencies which they are configured to receive, although the dimensions of the first antenna are indeed greater than those of the second. This setup may provide that second antenna 12 is directly exposed to the GPS signal without any intermediate damping elements, whereas a certain degree of damping of the DSRC signals received and transmitted by first antenna 8, may be tolerated relatively easily.

It is of course also possible, in the configuration illustrated in FIG. 1, to use the exterior second antenna 12, having the smaller dimensions, for receiving the higher-frequency DSRC signal and the larger antenna, arranged below, for receiving the GPS signal. In this case, for tuning the antennas to the resonant frequencies of GPS and DSRC signals, a smaller difference of the dielectric constants is necessary than in the case of the configuration described above.

One module including an exterior DSRC antenna and an interior GPS antenna may therefore be constructed somewhat more compactly and also more economically than one in which the GPS antenna is arranged on the exterior.

Figure 2:
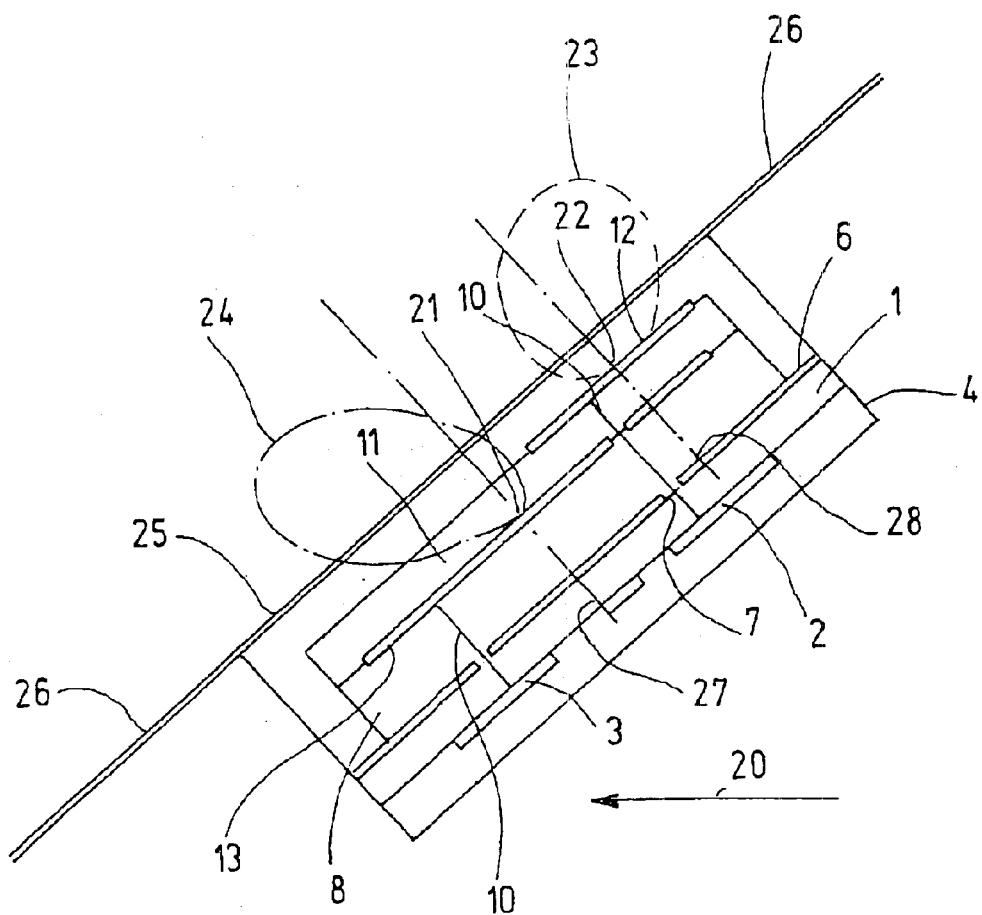
FIG. 2 illustrates an analogous view of a module installed in a vehicle according to an exemplary embodiment of the present invention.

FIG. 2 illustrates a receiver/transponder module according to an example embodiment of the present invention installed in a motor vehicle, in a cutaway view that is parallel to the direction of motion of the vehicle. A radom 25, i.e., a cover that is transparent to the GPS and DSRC radio signals, terminates flush with surrounding vehicle exterior skin 26. The radom may be painted the same color as the surrounding exterior skin 26, so that the position of the antennas on the vehicle may not be detected from the outside.

The normal direction of travel of the vehicle is indicated by an arrow 20. The module is installed in the vehicle in a diagonal orientation, e.g., on a surface that is parallel to the windshield, so that the antennas and ground plane 6 are each oriented in the direction of travel 20.

The configuration of the module in FIG. 2 basically corresponds to that in FIG. 1, so that everything described above in regard to the module of FIG. 1 also applies to that of FIG. 2. One difference between the two modules is that in FIG. 2, second microstrip antenna 12 is mounted so as to be laterally displaced, so that projections 27, 28 of centroids 21, 22 of two microstrip antennas 9, 12 do not coincide at ground plane 6 but rather are arranged one behind the other with respect to direction of travel 20.

The result of a set-up of this type is that in the edge area of second microstrip antenna 12 there are regions in dielectric plate 11 where the electrical flux lines of the transmitting and/or receiving signal do not extend perpendicular to the surfaces of the two antennas but rather at an acute angle. This has the effect that the magnetic flux induced in dielectric 11 by the transmission or reception is no longer oriented so as to be parallel to the lateral surfaces of dielectric 11, but rather is at an angle thereto.

As a consequence, the main transmitting direction of antenna 12, illustrated in the Figure as dotted contour 23, is not centered about its surface normal, but rather has a higher elevation angle than the surface normal.

In a complementary manner thereto, in first microstrip antenna 9, the overlapping of the magnetic currents, which are induced, on the one hand, between patch 13 and ground plane 6 and, on the other hand, between two patches 13 and 14, leads to a displacement of the main transmitting direction, illustrated here as a dot-dash outline 24, from the surface normal in the direction of a lower elevation angle. Antenna 12 is therefore especially well suited for receiving GPS radio signals, which on average are vertically incident, whereas the main transmitting direction of antenna 9 is better suited for communication with earth-bound transmitters such as those for DSRC radio signals, which, if the vehicle is not arranged in the immediate vicinity of the transmitter, arrive at the vehicle at a slight angle of elevation.

According to one alternative not illustrated in the Figure, it is also possible to install the module illustrated in FIG. 2 in a position that is rotated by 180° about a surface normal of one of the antennas. In this case, the main transmitting direction of exterior, second microstrip antenna 12 would be displaced in the direction of the horizontal and that of first microstrip antenna 9, arranged between exterior antenna 12 and ground plane 6, would be displaced along the vertical. A setup of this type would be appropriate if second antenna 12 is used for DSRC communication and the first for GPS reception.

Figure 3:
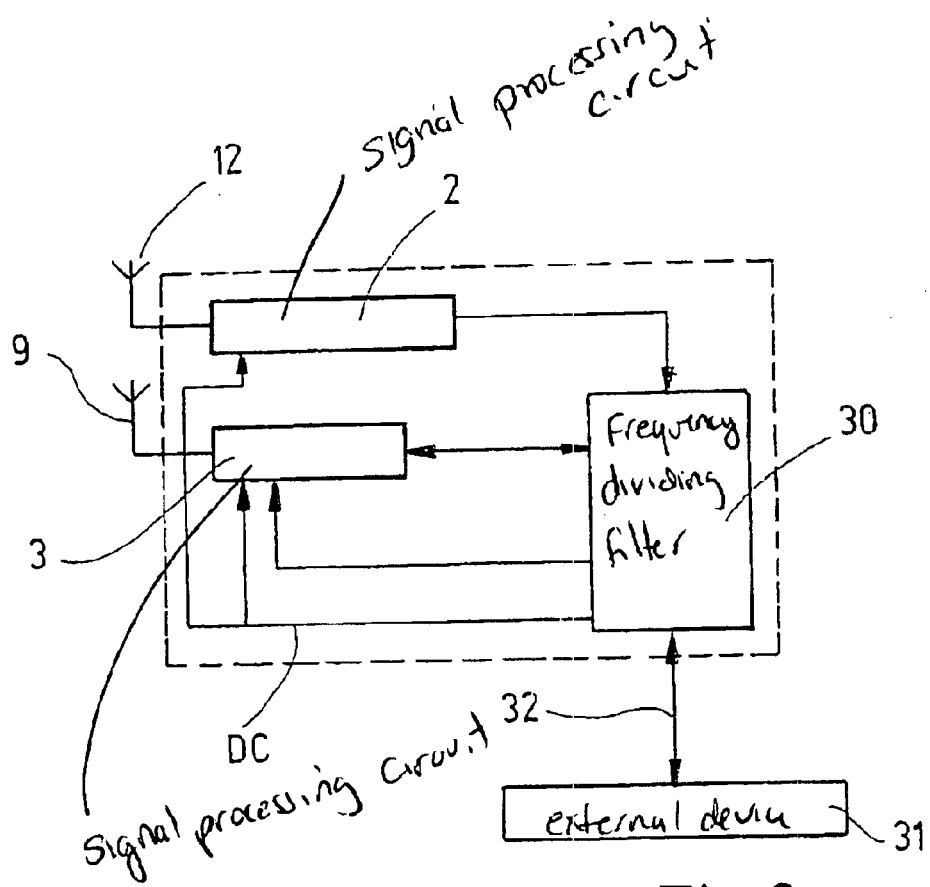
FIG. 3 illustrates a block diagram of the functional components of a module that supplies an analog output signal.

FIG. 3 illustrates a block diagram of the module showing its functional components. The dispositions of the antennas is the same as illustrated in FIG. 1 or 2; the antennas are illustrated separately only for illustrative purposes. Signal processing circuit 2 for the GPS signal includes a preamplifier, more precisely, a remote-fed, low-noise amplifier, and, if appropriate, a filter. The high-frequency received signal, preprocessed by circuit 2, is fed via a frequency dividing filter (diplexer) 30 to a coaxial cable, through which it may arrive at an external device 31 including the appropriate receiver.

Signal processing circuit 3 of the DSRC signal includes a transponder, which converts a received signal into a direct-component-free baseband signal, which is fed via frequency dividing filter 30 to external device 3 via coaxial cable 32, to be evaluated. A response signal is transmitted in the opposite direction from external device 31 via frequency dividing filter 30 to the transponder and is emitted via the latter. The input and output signals of the transponder are band-width limited, i.e., they have a lower and an upper frequency limit, and they are free of direct components.

Figure 4:
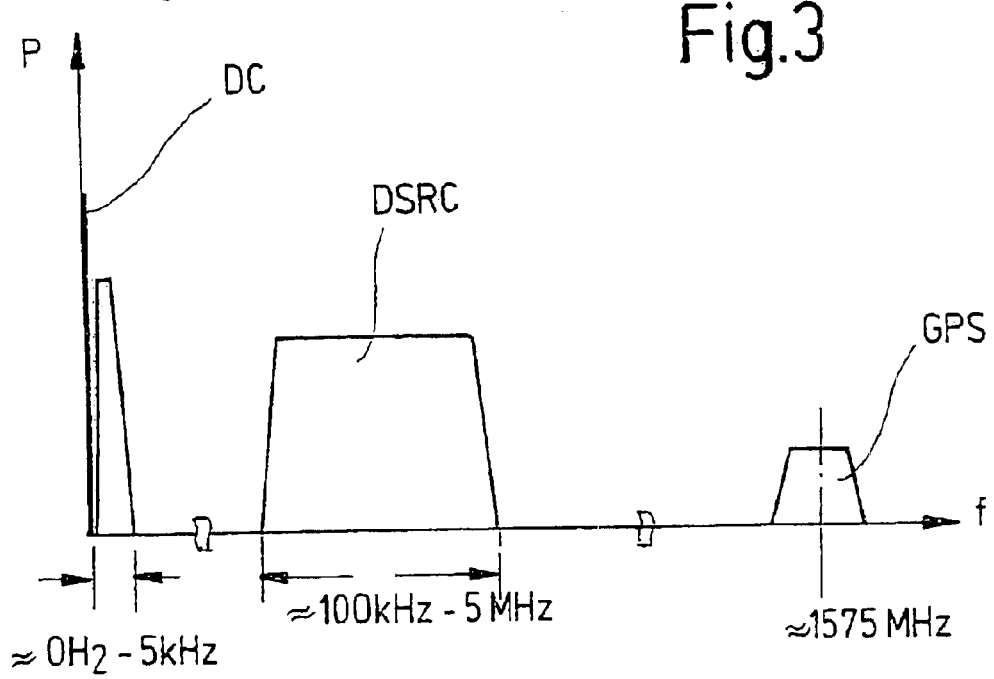
FIG. 4 illustrates the frequency spectrum of the output signal of the module from FIG. 3.

FIG. 4 illustrates the use of the different frequency ranges on coaxial line 32 between frequency dividing filter 30 and external device 31. One block in the frequency range of 100 kHz to 5 MHz represents the transponder baseband signal; the high-frequency signal of the GPS receiver is centered about 1575 MHz. Signals in the lower frequency range down to 5 kHz function to control the transponder; otherwise, a DC component is present that is fed from an voltage source (not shown), the DC component being separated out by frequency dividing filter 30 and functioning as a power supply for signal processing circuit 2, 3 via a line DC. The upper frequency limit of the transponder baseband signal is significantly lower than the operating frequency of the receiver. The lower frequency limit is significantly greater than half the maximum frequency of the control signals which control the switching between the receiving and responding modes of the transponder.

Figure 5:
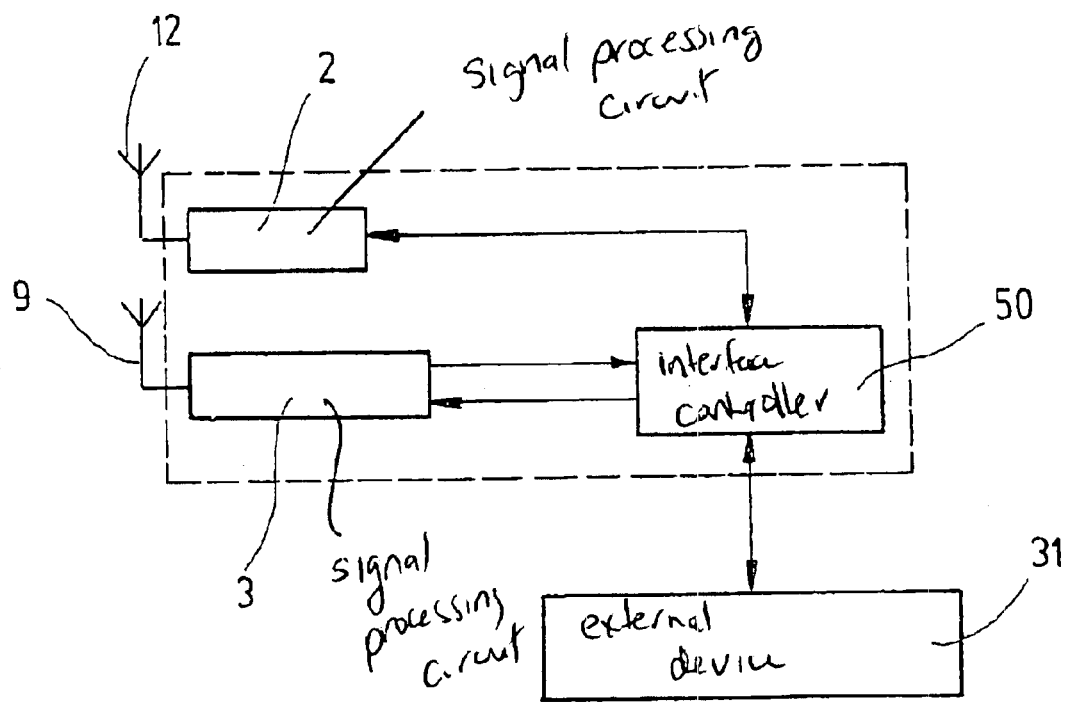
FIG. 5 illustrates a block diagram of a module that generates a digital output signal.

In the block diagram illustrated in FIG. 5 of the module, circuit 2 includes a complete GPS receiver, which is capable of performing a complete evaluation of the received GPS radio signals. The receiver is connected to an interface controller 50 via a digital interface. Via the interface, evaluated received data from the receiver are transmitted to interface controller 50, and control instructions are transmitted from interface controller 50 to the receiver of circuit 2. The transponder of circuit 3 is connected to interface controller 50 via a digital interface. In the receive mode (downlink), the received signals detected by the transponder are transmitted via the interface to the interface controller. In the response mode (uplink), the signals to be transmitted by the transponder, i.e., the response signals, are transmitted from interface controller 50 to the transponder via the interface. The interface also acts to assure that interface controller 50 may signal to the transponder the instantaneous operating mode—receiving or responding—, so that the transponder may adjust its operations accordingly.

Alternatively, circuit 3 in FIG. 5 contains a complete (DSRC) transponder modem, which handles the entire protocol stack and telematic applications (such as electronic fee assessment, access authorization . . . ).

The interface controller connects signal processing circuits 2 and 3 via a further digital interface, e.g., of the type RS422, RS485, MOST, or Firewire, to a communications bus or external device and, if appropriate, executes necessary protocol adjustments.

A module of this type, that operates in a completely digital manner, is very well suited for the combined use of navigational and telematic services. Integration of this type makes it possible, e.g., at a DSRC beacon station, to detect not only the passing of the vehicle, but also to query as to its traveled route and thus, for example, instead of an all-inclusive fee, to assess a fee that reflects the actual driving performance.

What is claimed is:

1. A vehicle navigational receiver module, comprising:
 a first planar antenna configured to receive navigational radio signals;
 a first signal processing circuit connected to the first planar antenna;
 a second planar antenna configured to receive telematic radio signals, the second planar antenna arranged so as to at least partially overlap the first planar antenna;
 a second signal processing circuit that is connected to the second planar antenna;
 a common connector configured to output the navigational radio signals and input/output the telematic signals, navigational radio signals and telematic radio signals being transmitted in different frequency ranges via the common connector;
 wherein a DC component of one of the navigational radio signals and the telematic radio signals applied at the common connector functions as a power source for the first signal processing circuit and the second signal processing circuit, and a control signal for switching over a signal processing circuit of the telematic signal between the transmitting and the receiving modes is transmitted in a further frequency range via the common connector.

2. The vehicle navigational receiver module of claim 1, wherein the first planar antenna includes a first patch, the second planar antenna includes a second patch, the first planar antenna and the second planar antenna share a common ground plane, and the first patch is arranged between the second patch and the ground plane.

3. The vehicle navigational receiver module of claim 2, wherein the first patch and the second patch are separated from each other by a first dielectric and from the ground plane by a second dielectric, the first dielectric and the second dielectric being plate-shaped, dielectric constants of the first dielectric and the second dielectric being different, and the dielectric constant of the second dielectric being lower than the dielectric constant of the first dielectric, and wherein the second patch of the second planar antenna borders on the second dielectric, and the first patch of the first planar antenna borders on the first dielectric.

4. The vehicle navigational receiver module of claim 2, wherein the first patch and the second patch are arranged in parallel planes.

5. The vehicle navigational receiver module of claim 2, wherein the first patch connected to the first processing circuit by a first respective supply line and the second patch is connected to the second processing circuit by a second respective supply line.

6. The vehicle navigational receiver module of claim 1, wherein the first planar antenna and the second planar antenna have different main transmitting directions.

7. The vehicle navigational receiver module of claim 6, wherein the vehicle navigational receiver module is configured for an installation position at an angle to a vehicle, a first main transmitting direction of the first planar antenna assigned for a navigational radio signal being oriented in a zenithal manner, and the second planar antenna assigned for a telematic radio signal being oriented in a direction of travel.

8. The vehicle navigational receiver module of claim 6, wherein a first plurality of centroids of the first patch projected onto the ground and a second plurality of centroids of the second patch projected onto the ground plane are offset with respect to each other.

9. The vehicle navigational receiver module of claim 8, wherein a link between the first plurality of centroids and the second plurality of centroids extends in a direction of a strongest gradient of the ground plane.

10. The vehicle navigational receiver module of claim 1, wherein the first signal processing circuit and the second signal processing circuit are mounted on a common printed circuit board.

11. The vehicle navigational receiver module of claim 5, wherein the first supply line of the first patch is routed through an opening in the second patch.

12. The vehicle navigational receiver module of claim 1, wherein the common connector is configured for connecting a coaxial cable.

* * * * *